US011212637B2

(12) United States Patent
Guo et al.

(10) Patent No.: US 11,212,637 B2
(45) Date of Patent: Dec. 28, 2021

(54) COMPLEMENTARY VIRTUAL AUDIO GENERATION

(71) Applicant: QUALCOMM Incorporated, San Diego, CA (US)

(72) Inventors: Yinyi Guo, San Diego, CA (US); Lae-Hoon Kim, San Diego, CA (US); Dongmei Wang, San Diego, CA (US); Erik Visser, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 243 days.

(21) Appl. No.: 15/951,907

(22) Filed: Apr. 12, 2018

(65) Prior Publication Data

US 2019/0320281 A1 Oct. 17, 2019

(51) Int. Cl.

*H04M 3/00* (2006.01)
*H04M 7/00* (2006.01)
*H04S 7/00* (2006.01)
*H04S 3/00* (2006.01)
*G10L 19/00* (2013.01)
*H04R 1/40* (2006.01)

(52) U.S. Cl.

CPC .............. *H04S 7/304* (2013.01); *G10L 19/00* (2013.01); *H04R 1/406* (2013.01); *H04S 3/008* (2013.01); *H04S 2400/01* (2013.01); *H04S 2400/11* (2013.01)

(58) Field of Classification Search

CPC ......... G10L 19/00; H04R 1/406; H04S 3/008; H04S 7/305; H04S 7/30; H04S 7/00; H04S 2400/01; H04S 2400/11

USPC .......................................................... 381/303

See application file for complete search history.

(56) References Cited

U.S. PATENT DOCUMENTS

| | | | |
|---|---|---|---|
| 8,805,697 | B2 | 8/2014 | Visser et al. |
| 8,996,296 | B2 | 3/2015 | Xiang |
| 9,111,526 | B2 | 8/2015 | Visser et al. |
| 9,495,591 | B2 | 11/2016 | Visser et al. |

(Continued)

FOREIGN PATENT DOCUMENTS

| | | | | |
|---|---|---|---|---|
| GB | 2562518 A | * 11/2018 | | H04S 7/305 |
| KR | 20130005442 A | 1/2013 | | |
| WO | 2014175482 A1 | 10/2014 | | |

OTHER PUBLICATIONS

Chen B., et al., "Adaptive Fuzzy Output Tracking Control of MIMO Nonlinear Uncertain Systems", IEEE Transactions on Fuzzy Systems, vol. 15, No. 2, Apr. 2007, pp. 287-300.

(Continued)

*Primary Examiner* — Harry S Hong
*Assistant Examiner* — Jirapon Intavong
(74) *Attorney, Agent, or Firm* — Moore IP

(57) ABSTRACT

An apparatus includes a processor configured to receive one or more media signals associated with a scene. The processor is also configured to identify a spatial location in the scene for each source of the one or more media signals. The processor is further configured to identify audio content for each media signal of the one or more media signals. The processor is also configured to determine one or more candidate spatial locations in the scene based on the identified spatial locations. The processor is further configured to generate audio to playback as virtual sounds that originate from the one or more candidate spatial locations.

30 Claims, 10 Drawing Sheets

(56) References Cited

U.S. PATENT DOCUMENTS

| | | | | |
|---|---|---|---|---|
| 9,654,644 | B2 * | 5/2017 | Spittle | H04M 3/568 |
| 9,773,483 | B2 * | 9/2017 | Rutledge | G10H 1/0025 |
| 10,026,229 | B1 * | 7/2018 | Yalniz | G06K 9/00671 |
| 2008/0008326 | A1 * | 1/2008 | Reichelt | H04S 7/30<br>381/17 |
| 2009/0080632 | A1 * | 3/2009 | Zhang | H04M 3/568<br>379/202.01 |
| 2015/0160022 | A1 | 6/2015 | Xiang | |
| 2016/0247496 | A1 * | 8/2016 | Pachet | G10H 1/18 |
| 2017/0092246 | A1 | 3/2017 | Manjarrez et al. | |
| 2017/0213534 | A1 | 7/2017 | Braasch et al. | |
| 2017/0364752 | A1 * | 12/2017 | Zhou | G10K 1/38 |
| 2019/0166674 | A1 * | 5/2019 | Mason | H04N 21/42202 |

OTHER PUBLICATIONS

Jagathishwaran R., et al., "A Survey on Face Detection and Tracking", World Applied Sciences Journal 29 (Data Mining and Soft Computing Techniques), 2014, pp. 140-145.

Jaques N., et al., "Tuning Recurrent Neural Networks with Reinforcement Learning", Under review as a conference paper at ICLR 2017, Dec. 7, 2016, pp. 1-12.

Paul R., et al., "A New Fuzzy Based Algorithm for Solving Stereo Vagueness in Detecting and Tracking People", International Journal of Approximate Reasoning, 2012, pp. 693-708.

* cited by examiner

COMPLEMENTARY VIRTUAL AUDIO GENERATION

I. FIELD

The present disclosure is generally related to generation of audio.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A user of a device can listen to audio (e.g., music or speech) that is captured by a microphone of the device. The user's listening experience may be diminished if the audio is the product of a small number of audio sources. For example, if music (captured by the microphone) includes a singer's voice that is not accompanied by any background music (e.g., acapella music), the user's listening experience may be less than desirable. If the singer's voice is accompanied by a piano, the user's listening experience may be enhanced. However, additional musical accompaniment may further enhance the user's listening experience.

III. SUMMARY

According to one implementation of the techniques disclosed herein, an apparatus includes a processor configured to obtain one or more media signals associated with a scene. The processor is also configured to identify a spatial location in the scene for each source of the one or more media signals. The processor is further configured to identify audio content for each media signal of the one or more media signals. The processor is also configured to determine one or more candidate spatial locations in the scene based on the identified spatial locations. The processor is further configured to generate audio to playback as virtual sounds that originate from the one or more candidate spatial locations.

According to another implementation of the techniques disclosed herein, a method includes obtaining, at a processor, one or more media signals associated with a scene. The method also includes identifying a spatial location in the scene for each source of the one or more media signals. The method further includes identifying audio content for each media signal of the one or more media signals. The method also includes determining one or more candidate spatial locations in the scene based on the identified spatial locations. The method further includes generating audio to playback as virtual sounds that originate from the one or more candidate spatial locations.

According to another implementation of the techniques disclosed herein, a non-transitory computer-readable medium includes instructions, that when executed by a processor, cause the processor to perform operations including obtaining one or more media signals associated with a scene. The operations also include identifying a spatial location in the scene for each source of the one or more media signals. The operations further include identifying audio content for each media signal of the one or more media signals. The operations also include determining one or more candidate spatial locations in the scene based on the identified spatial locations. The operations further include generating audio to playback as virtual sounds that originate from the one or more candidate spatial locations.

According to another implementation of the techniques disclosed herein, an apparatus includes means for obtaining one or more media signals associated with a scene. The apparatus also includes means for identifying a spatial location in the scene for each source of the one or more media signals. The apparatus further includes means for identifying audio content for each media signal of the one or more media signals. The apparatus also includes means for determining one or more candidate spatial locations in the scene based on the identified spatial locations. The apparatus further includes means for generating audio to playback as virtual sounds that originate from the one or more candidate spatial locations.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" content (or a signal) may refer to actively generating, estimating, calculating, or determining the content (or the signal) or may refer to using, selecting, or accessing the content (or signal) that is already generated, such as by another component or device.

Figure 1:
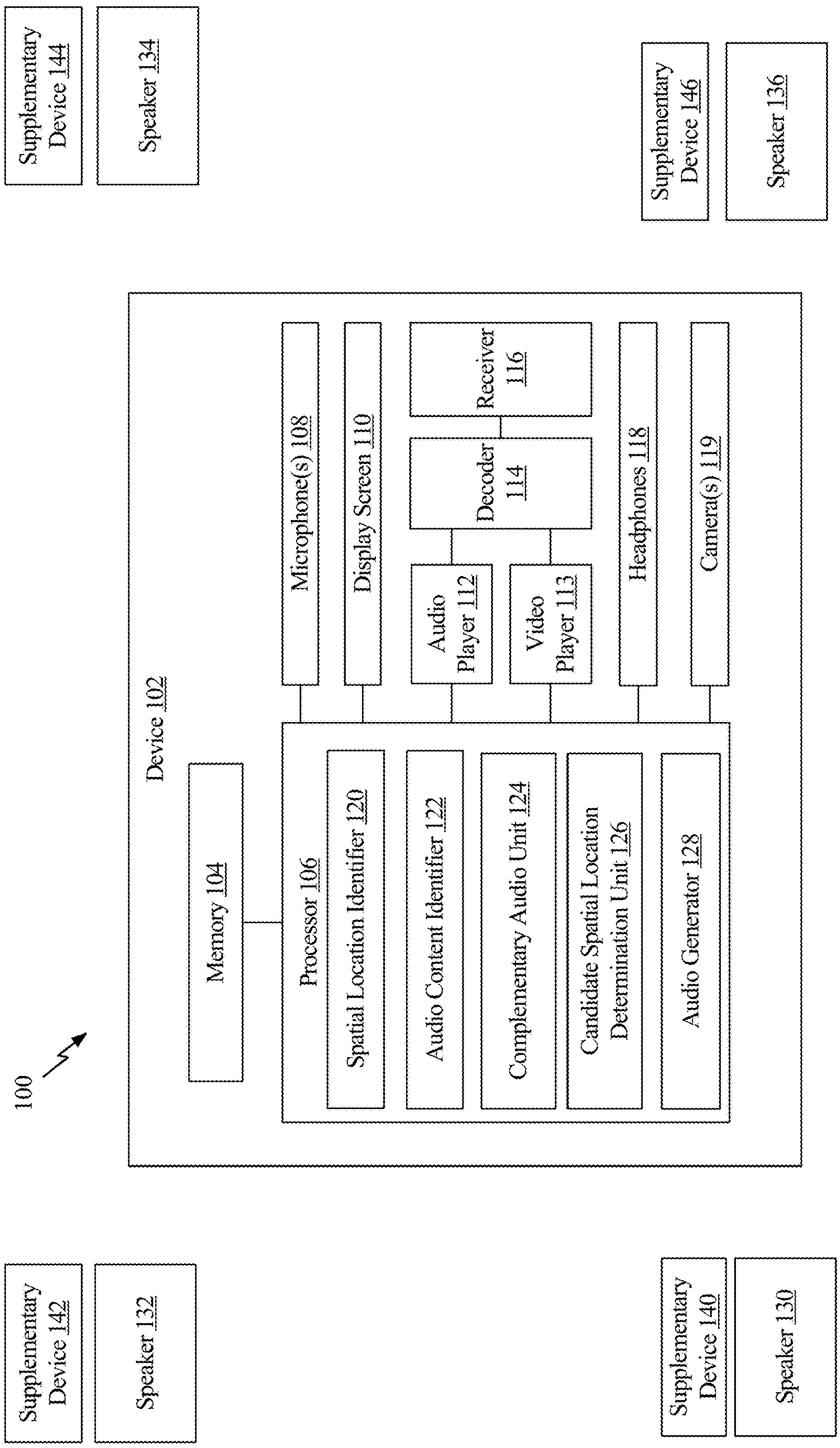
FIG. 1 is a block diagram of an implementation of a system that is operable to generate audio to playback as complementary virtual sounds.

Referring to FIG. 1, a system 100 that is operable to generate audio to playback as complementary virtual sounds is shown. For example, the system 100 is operable to detect surrounding sounds and generate virtual sounds that accompany (or complement) the surrounding sounds. According to one implementation, the virtual sounds correspond to a musical accompaniment for detected musical sounds, as described with respect to FIG. 3. According to another implementation, the virtual sounds correspond to speech dialogue to accompany a nearby conversation, as described with respect to FIG. 4. As described below, based on spatial cues associated with candidate spatial locations (e.g., locations without real audio sources), the virtual sounds are distributed (e.g., panned) in such a manner as to increase a user experience. In an example, the virtual sounds are panned such that a user can appreciate the virtual sounds and the real sounds detected by the system 100.

Figure 8:
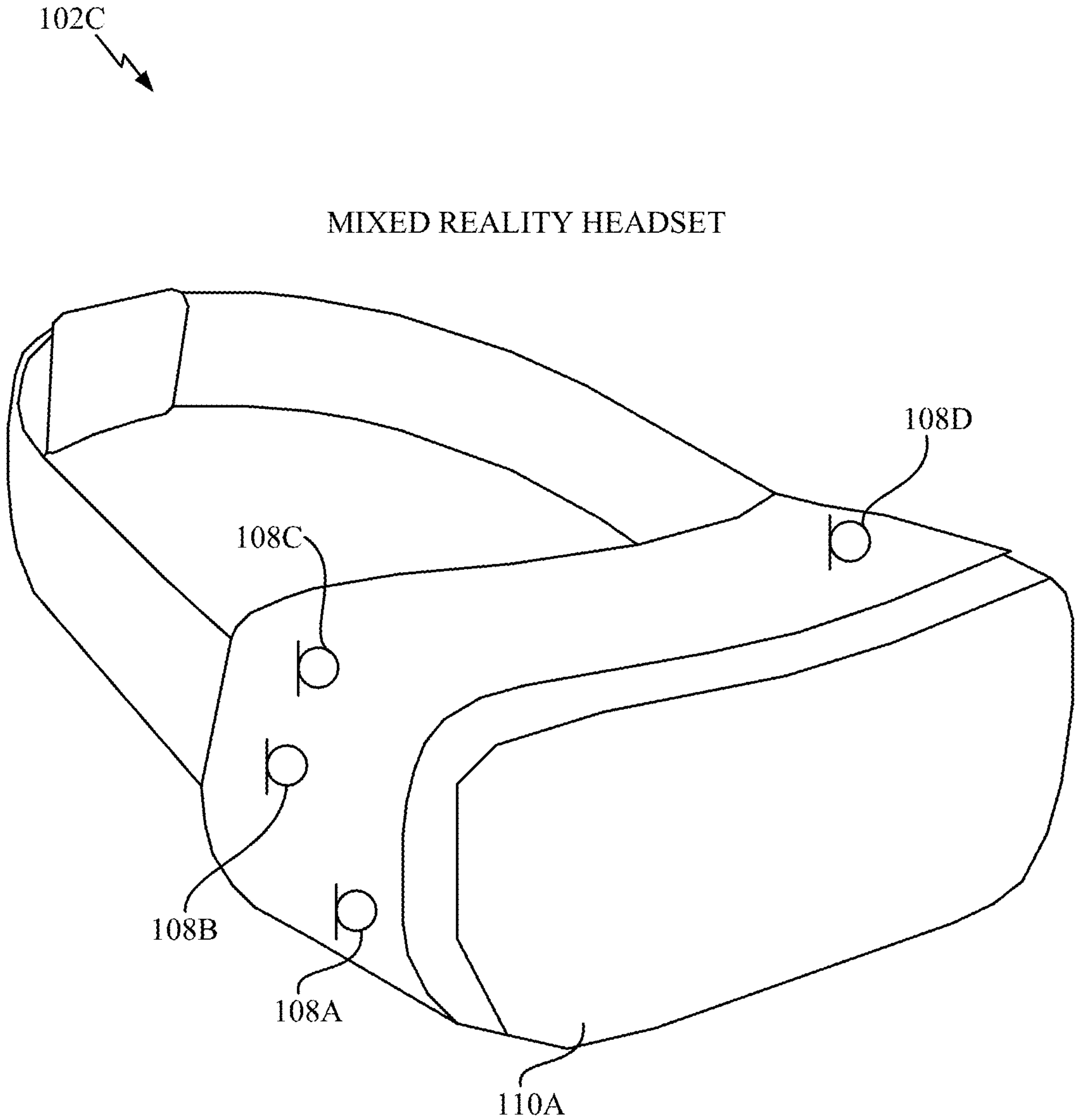
FIG. 8 depicts a mixed reality headset that is operable to generate audio to playback as complementary virtual sounds.

The system 100 includes a device 102 that is operable to generate the audio based on the surrounding sounds. The device 102 includes a memory 104 and a processor 106 coupled to the memory 104. The processor 106 includes a spatial location identifier 120, an audio content identifier 122, a complementary audio unit 124, a candidate spatial location determination unit 126, and an audio generator 128. According to one implementation, the device 102 is a virtual reality device, an augmented reality device, or a mixed reality device. In a non-limiting example, the device 102 is a mixed reality headset worn by a user, as illustrated in FIG. 8. According to another implementation, the device 102 is a standalone device.

Figure 2:
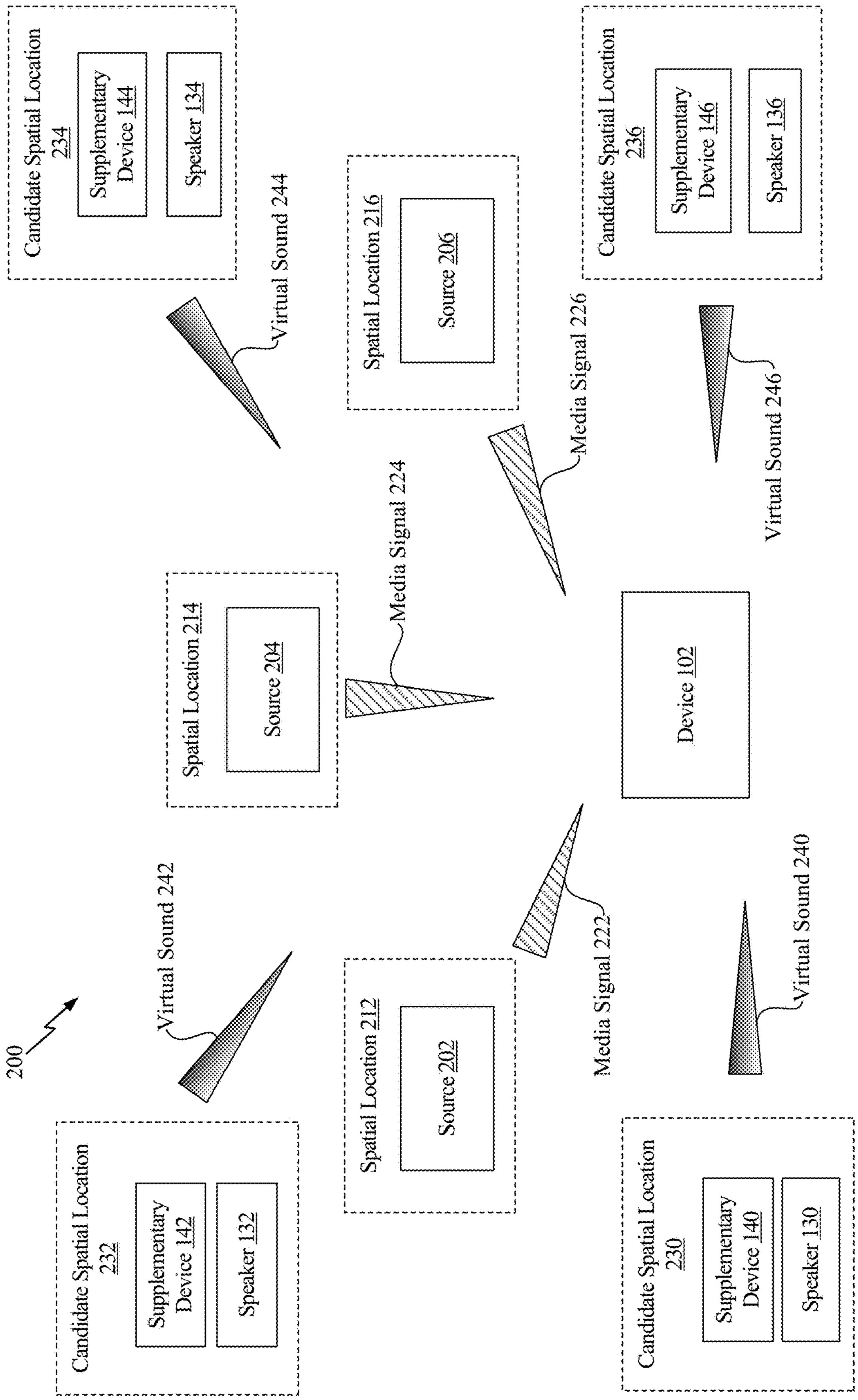
FIG. 2 depicts a scene that includes a device operable to generate audio to playback as complementary virtual sounds.

The processor 106 is configured to obtain one or more media signals associated with a scene, such as illustrated in FIG. 2. For example, the device 102 includes one or more microphones 108 that are coupled to the processor 106. The one or more microphones 108 are configured to capture media signals proximate to the device 102. According to one implementation, the media signals include audio signals, as described in with respect to FIGS. 3-4. One or more images may also be associated with the one or more media signals. For example, in FIG. 1, one or more cameras 119 are coupled to the processor 106. The cameras 119 are configured to capture the images associated with the media signals. For example, the cameras 119 may capture the sources from which the media signals are generated. According to another implementation, the media signals are obtained from the memory 104. For example, the media signals may be stored in the memory 104 and the processor 106 may read data associated with the media signals from the memory 104.

In one implementation, the media signals are extracted from a media bitstream (not shown). To illustrate, in FIG. 1, the device 102 includes a receiver 116 that is configured to receive the media bitstream. For example, the receiver 116 may wirelessly receive the media bitstream from another device. Representations of the media signals are included in the media bitstream. A decoder 114 is coupled to the receiver 116. The decoder 114 is configured to decode the media bitstream to generate a decoded media bitstream. An audio player 112 is coupled to the decoder 114 and to the processor 106, and a video player 113 is coupled to the decoder 114 and to the processor 106. The audio player 112 is configured to play the decoded media bitstream to generate reconstructed audio signals, and the video player 113 is configured to play the decoded media bitstream to generate reconstructed images. The reconstructed audio signals correspond to the audio signals included in the media signals, and the reconstructed images correspond to the images associated with the media signals.

The spatial location identifier 120 is configured to identify a spatial location in the scene for each source of the media signals. For example, as described in greater detail with respect to FIG. 5, the spatial location identifier 120 is configured to determine a direction-of-arrival for each media signal. The spatial location for each source is based on the direction-of-arrival of a corresponding media signal. In the illustrative example of FIG. 1, a display screen 110 is coupled to the processor 106. The display screen 110 is configured to display an arrangement in space of each source of the one or more media signals. For example, the display screen 110 displays the location of each source relative to the location of the device 102. The displayed arrangement can be based on the decoded media bitstream played by the video player 113. For example, the video player 113 can provide images to the processor 106, and the processor 106 can reconstruct the images to display at the display screen 110.

The audio content identifier 122 is configured to identify audio content for each of the media signals. As a non-limiting example, in the musical context scenario described in greater detail with respect to FIG. 3, the audio content for a particular audio signal (included in the media signals) may indicate a melody associated with the particular audio signal, a type of instrument associated with the particular audio signal, a genre of music associated with the particular audio signal, or a combination thereof. As another non-limiting example, in the speech context scenario described in greater detail with respect to FIG. 4, the audio content for a particular audio signal (included in the media signals) may indicate a mood of a speaker associated with the particular audio signal, a gender of the speaker, an emotion of the speaker, a conversation topic associated with the speaker, or a combination thereof.

Figure 9:
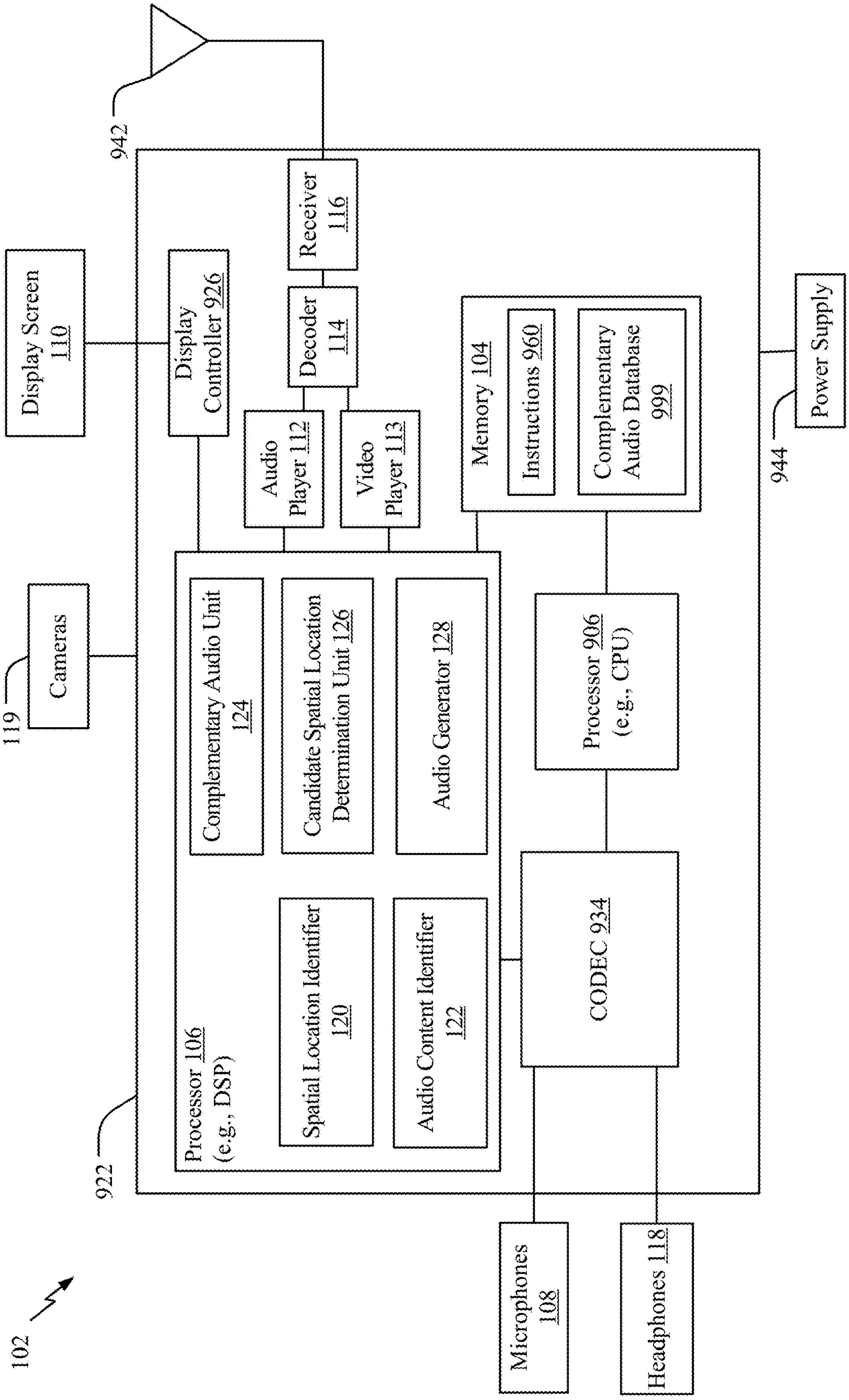
FIG. 9 is a block diagram of a particular illustrative example of a mobile device that is operable to perform the techniques described with reference to FIGS. 1-8.

According to one implementation, the complementary audio unit 124 is configured to generate complementary audio content based on the audio content. For example, in the musical context scenario described with respect to FIG. 3, the complementary audio unit 124 generates musical content that accompanies the audio content. As another example, in the speech context scenario described with respect to FIG. 4, the complementary audio unit 124 generates speech content that accompanies the audio content. According to another implementation, the complementary audio unit 124 is configured to select the complementary audio content based on the audio content. For example, as illustrated in FIG. 9, the memory 104 may include a database of complementary audio content, and the complementary audio unit 124 selects particular complementary audio content (from the database) that accompanies the audio content.

The candidate spatial location determination unit 126 is configured to determine one or more candidate spatial locations in the scene based on the identified spatial locations. For example, as described in greater detail with respect to FIG. 5, the candidate spatial location determination unit 126 inputs the identified spatial locations into an adaptation block to determine the one or more candidate spatial locations. The adaptation block includes a neural network, a Kalman filter, an adaptive filter, a fuzzy logic controller, or a combination thereof. As described herein, a "candidate" spatial location corresponds to a location within a scene that is not associated with an audio source. In some implementations, a candidate spatial location may include a physical object without an audio source (e.g., a chair without a person). In these scenarios, it may be beneficial to insert a virtual audio source (e.g., a virtual chat-bot) in the candidate spatial location.

The audio generator 128 is configured to generate audio to playback as virtual sounds that originate from the candidate spatial locations. The audio includes the complementary audio content to the audio content. The complementary audio is panned based on stereo cues associated with the candidate spatial locations. One or more speakers 130-136 are wirelessly coupled to the processor 106. Each speaker 130-136 is located at a different candidate spatial location. The audio is distributed (e.g., provided) to the speakers 130-136 for playback based on the stereo cues. In another implementation, the one or more speakers 130, 132, 134 136 are physically coupled to the device 102 (e.g., to the processor 106). Additionally, or in the alternative, headphones 118 can be coupled to the processor 106 (e.g., as a component of the device 102 or coupled to the device 102), as illustrated in FIG. 1. Thus, in some implementations, the audio is provided to the headphones 118 for playback.

The system 100 also includes supplementary devices 140-146 that are proximate to (or integrated within) the speakers 130-136, respectively. According to one implementation, the supplementary devices 140-146 are Internet-of-Things (IoT) devices. The supplementary devices 140-146 are configured to activate in response to a corresponding speaker outputting sound (e.g., outputting the audio). According to one implementation, the supplementary devices 140-146 include lights, and the activation of the supplementary devices 140-146 includes illumination of the lights. According to another implementation, the supplementary devices 140-146 include virtual assistants, and activation of the supplementary devices 140-146 includes generation of the complementary sound.

The system 100 of FIG. 1 enables complementary audio to be inserted into a scene based on detected audio within the scene. As a result, a user experience is enhanced. For example, the device 102 can generate complementary music to be inserted into the scene as virtual audio if a relatively small number of musical sources are present in the scene. To illustrate, the device 102 detects that a nearby singer is singing acapella, the device 102 can generate a musical accompaniment for the singer and insert the musical accompaniment into the scene using the speakers 130-136. The musical accompaniment is panned based on spatial cues (e.g., based on a location of the candidate spatial locations). Thus, the system 100 enables generation of complementary virtual audio to enhance (e.g., add to) the acoustical arrangement of a nearby scene.

Although four speakers 130-136 are illustrated in the system 100, in other implementations, a different number of speakers (or no speakers) are included in the system 100. Additionally, although four supplementary devices 140-146 are illustrated in the system 100, in other implementations, a different number of supplementary devices (or no supplementary devices) are included in the system 100. Although the microphones 108, the receiver 116, and the cameras 119 are described, in some implementations, the virtual audio is generated based a single component (e.g., one of the microphones 108, the receiver 116, or the cameras 119) or a combination of the components.

Referring to FIG. 2, a scene 200 that includes the device 102, the speakers 130-136, and the supplementary devices 140-144 is shown. A source 202 (e.g., an audio source) is located at a spatial location 212 in the scene 200, a source 204 (e.g., an audio source) is located at a spatial location 214 in the scene 200, and a source 206 (e.g., an audio source) is located at a spatial location 216 in the scene 200.

The device 102 is configured to obtain one or more media signals 222-226 associated with the scene 200. For example, the one or more microphones 108 are configured to capture a media signal 222 from the source 202, a media signal 224 from the source 204, and a media signal 226 from the source 206. According to one implementation, a single camera within the device 102 captures a visual component of each media signal 222-226. According to yet another implementation, the processor 106 obtains the one or more media signals 222-226 by reading data (associated with the media signals 222-226) from the memory 104. The captured media signals 222-226 are provided to the spatial location identifier 120 of the device 102.

The spatial location identifier 120 is configured to identify the spatial locations 212-216 in the scene 200 for each source 202-206 of the one or more media signals 222-226, respectively. For example, the spatial location identifier 120 determines a first direction-of-arrival of the media signal 222. Based on the first direction-of-arrival, the spatial location identifier 120 identifies the spatial location 212 of the source 202. Additionally, the spatial location identifier 120 determines a second direction-of-arrival of the media signal 224. Based on the second direction-of-arrival, the spatial location identifier 120 identifies the spatial location 214 of the source 204. In a similar manner, the spatial location identifier 120 determines a third direction-of-arrival of the media signal 226. Based on the third direction-of-arrival, the spatial location identifier 120 identifies the spatial location 216 of the source 206. In some examples, the spatial locations 212-216 are directional and do not include distance information (e.g., a distance from the device 102). In other examples, the spatial locations 212-216 include estimated distance information.

The audio content identifier 122 of the device 102 is configured to identify audio content for each media signal 222-226. For example, the audio content identifier 122 identifies first audio content of the media signal 222, second audio content of the media signal 224, and third audio content of the media signal 226. According to one implementation, the audio content of the media signals 222-226 indicates melodies associated with the media signals 222-226, types of instruments of the sources 202-206 associated with the media signals 222-226, genres of music associated with the media signals 222-226, or a combination thereof. According to another implementation, the audio content of the media signals 222-226 indicates moods of speakers (e.g., the sources 222-226), genders of the speakers, emotions of the speakers, conversation topics, or a combination thereof.

The candidate spatial location determination unit 126 is configured to determine one or more candidate spatial locations 230-236 in the scene 200 based on the identified spatial locations 212, 214, 216. To illustrate, the candidate spatial location determination unit 126 inputs data indicative of the identified spatial locations 212-216 into an adaptation block to determine the candidate spatial locations 230-236. The candidate spatial locations 230-236 correspond to locations within the scene 200 that are not associated with an audio source. In FIG. 2, the speakers 130-136 and the supplementary devices 140-146 are located at the candidate spatial locations 230-236, respectively. However, in other implementations, one or more of the candidate spatial locations 230-236 do not include any components of the system 100 (e.g., a spatial location may be determined to be a candidate spatial location suitable for use as the source of a virtual sound even if the location does not include a speaker or supplemental device).

The audio generator 128 is configured to generate audio (e.g., panned complementary audio) to playback as virtual sounds 240-246 that originate from the one or more candidate spatial locations 230-236, respectively. The audio can be played using the headphones 118 or at least one of the speakers 130-136.

The techniques described with respect to FIG. 2 enables complementary audio to be inserted into the scene 200 using the speakers 130-136 based on detected audio from the sources 202-206. As a result, a user experience is enhanced. For example, the device 102 can generate complementary music to be inserted into the scene as virtual audio if a relatively small number of musical sources are present in the scene. To illustrate, the device 102 detects that a nearby singer is singing acapella, the device 102 can generate a musical accompaniment for the singer and insert the musical accompaniment into the scene using the speakers 130-136. The musical accompaniment is panned based on spatial cues (e.g., based on a location of the candidate spatial locations 230-236). Thus, the system 100 enables generation of complementary virtual audio to enhance (e.g., add to) the acoustical arrangement of a nearby scene.

Figure 3:
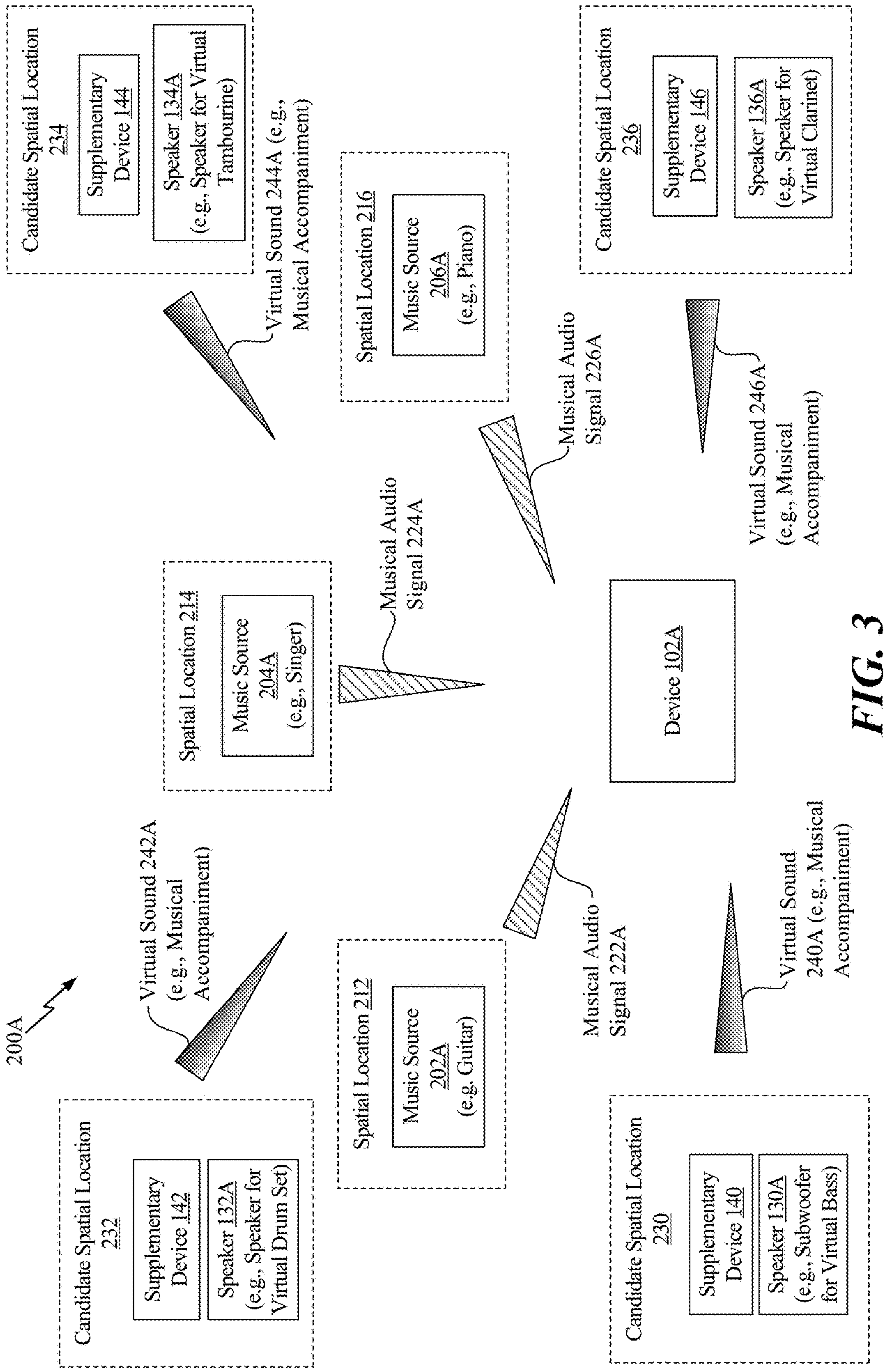
FIG. 3 depicts another scene that includes a device operable to generate audio to playback as complementary virtual sounds to detected music.

Referring to FIG. 3, a scene 200A is shown. The scene 200A is an example implementation of the scene 200 of FIG. 2. The scene 200A includes a device 102A, a music source 202A, a music source 204A, and a music source 206A. The device 102A is an example of the device 102, and the music sources 202A-206A are examples of the sources 202-206.

According to FIG. 3, the music source 202A is a guitar, the music source 204A is a singer, and the music source 206A is a piano. The music source 202A generates a musical audio signal 222A (e.g., guitar tones), the music source 204A generates a musical audio signal 224A (e.g., vocals), and the music source 206A generates a musical audio signal 226A (e.g., piano tones). According to one implementation, the musical audio signals 222A-226A are included in the media signals 222-226. The microphones 108 of the device 102A are configured to capture the musical audio signals 222A-226A.

The spatial location identifier 120 is configured to identify the spatial locations 212-216 in the scene 200A for each music source 202A-206A. For example, the spatial location identifier 120 determines a first direction-of-arrival of the musical audio signal 222A. Based on the first direction-of-arrival, the spatial location identifier 120 identifies the spatial location 212 of the music source 202A. Additionally, the spatial location identifier 120 determines a second direction-of-arrival of the musical audio signal 224A. Based on the second direction-of-arrival, the spatial location identifier 120 identifies the spatial location 214 of the music source 204A. In a similar manner, the spatial location identifier 120 determines a third direction-of-arrival of the musical audio signal 226A. Based on the third direction-of-arrival, the spatial location identifier 120 identifies the spatial location 216 of the music source 206A. Thus, the spatial location identifier 120 can determine where the instruments (e.g., the sources 202-206) are located.

The audio content identifier 122 of the device 102A is configured to identify audio content for each musical audio signal 222A-226A. To illustrate, the audio content identifier 122 identifies first audio content of the musical audio signal 222A (e.g., identifies a melody associated with the guitar tones, identifies the music source 202A as a guitar, identifies a genre of music associated with melody, or a combination thereof). The audio content identifier 122 also identifies second audio content of the musical audio signal 224A (e.g., identifies a melody associated with the voice, identifies the music source 204A as a solo vocalist, identifies a genre of music associated with the melody, etc.). The audio content identifier 122 also identifies third audio content of the musical audio signal 226A (e.g., identifies a melody associated with the piano tones, identifies the music source 206A as a piano, etc.).

Thus, the audio content identifier 122 determines the type of music being played in the scene 200A. For example, the musical audio signals 222A-226A are provided to the audio content identifier 122, and the audio content identifier 122 determines whether the sources 202-206 are playing jazz, hip-hop, classical music, etc. The audio content identifier 122 can also determine what instruments are present in the scene 220A based on the musical audio signals 222A-226A.

The complementary audio unit 124 is configured to generate complementary audio to accompany the musical audio signals 222A-226A. For example, the complementary audio unit 124 may generate a channel for a bass to accompany the musical audio signals 222A-226A, a channel for a drum set to accompany the musical audio signals 222A-226A, a channel for a tambourine to accompany the musical audio signals 222A-226A, and a channel for a clarinet to accompany the musical audio signals 222A-226A. Thus, the complementary audio unit 124 generates a musical accompaniment to the real audio (e.g., the musical audio signals 222A-226A) detected by the microphones 108. To illustrate, the complementary audio unit 124 can generate channels for missing instruments and probable note sequence for each missing instrument. In the example of FIG. 3, the complementary audio unit 124 generates note sequences for a virtual bass, a virtual drum set, a virtual tambourine, and a virtual clarinet.

The candidate spatial location determination unit 126 is configured to determine the candidate spatial locations 230-236 in the scene 200A based on the identified spatial locations 212-216. To illustrate, the candidate spatial location determination unit 126 inputs data indicative of the identified spatial locations 212-216 into an adaptation block to determine the candidate spatial locations 230-236. The candidate spatial locations 230-236 correspond to locations within the scene 200A that are not associated with the music sources 202A-206A.

According to some implementations, the candidate spatial location determination unit 126 determines a most probable location for each virtual instrument. The most probable locations may be determined based on information indicating a particular band arrangement. To illustrate, the candidate spatial location determination unit 126 may determine that the candidate spatial location 230 is the most probable location for the virtual bass, the candidate spatial location 232 is the most probable location for the virtual drum set, the candidate spatial location 234 is the most probable location for the virtual tambourine, and the candidate spatial location 236 is the most probable location for the virtual clarinet.

The audio generator 128 is configured to generate audio (e.g., panned complementary audio) to playback as virtual sounds that originate from the candidate spatial locations 230-236. For example, the audio generator 128 generates bass audio that is panned towards the candidate spatial location 230 or provided to a speaker 130A (e.g., a subwoofer for a virtual bass). The speaker 130A outputs the bass sounds as virtual sound 240A to accompany the music sources 202A-206A. The audio generator 128 generates drum audio that is panned towards the candidate spatial location 232 or provided to a speaker 132A (e.g., a speaker for a virtual drum set). The speaker 132A outputs the drum sounds as virtual sound 242A to accompany the music sources 202A-206A. The audio generator 128 generates tambourine audio that is panned towards the candidate spatial location 234 or provided to a speaker 134A (e.g., a speaker for a virtual tambourine). The speaker 134A outputs the tambourine sounds as virtual sound 244A to accompany the music sources 202A-206A. The audio generator 128 generates clarinet audio that is panned towards the candidate spatial location 236 or provided to a speaker 136A (e.g., a speaker for a virtual clarinet). The speaker 136A outputs the clarinet sounds as virtual sound 246A to accompany the music sources 202A-206A.

According to one implementation, the processor 106 may insert a virtual bass, a virtual drum set, a virtual tambourine, and a virtual clarinet into the virtual locations 230-236 on the display screen 110. Thus, a user can see virtual instruments, via the display screen 110, along with the real music sources 202A-206A to create an enhanced mixed reality experience while the virtual audio is played. The supplemental devices 140-146 activate each time a sound is output by a respective speaker 130A-136A. As a non-limiting example, the supplemental devices 140-146 may illuminate each time a sound is output by a respective speaker 130A-136A.

The techniques described with respect to FIG. 3 enables complementary audio to be inserted into the scene 200A using the speakers 130A-136A based on detected musical audio signals 222A-226A from the music sources 202A-206A. As a result, a user experience is enhanced. For example, the device 102A can generate complementary music to be inserted into the scene 200A as virtual sounds 240A-246A if a relatively small number of musical sources 202A-206A are present in the scene 200A.

Figure 4:
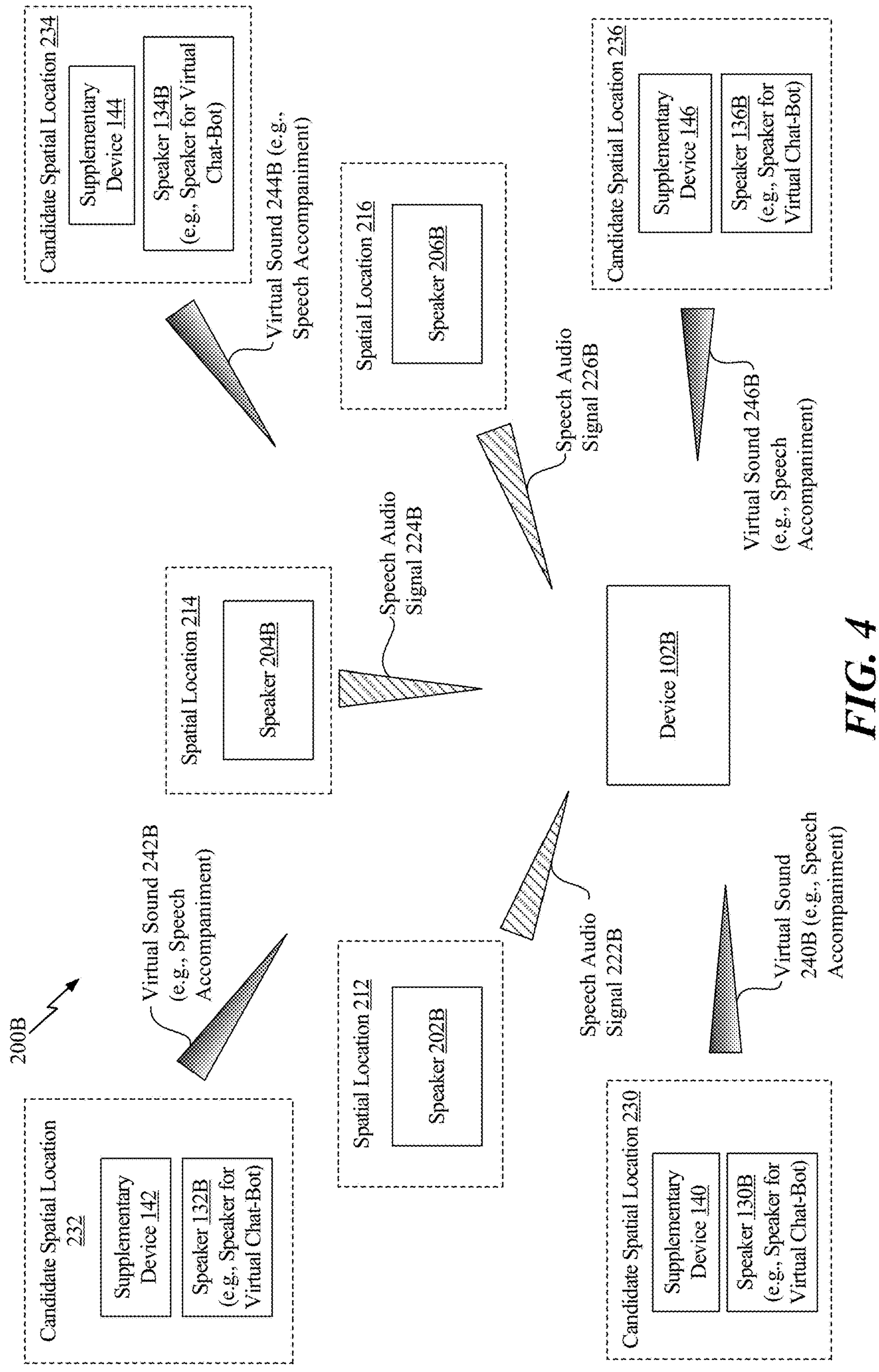
FIG. 4 depicts another scene that includes a device operable to generate audio to playback as complementary virtual sounds to detected speech.

Referring to FIG. 4, a scene 200B is shown. The scene 200B is an example implementation of the scene 200 of FIG. 2. The scene 200B includes a device 102B, a speaker 202B, a speaker 204B, and a speaker 206B. The device 102B is an example of the device 102, and the speakers 202B-206B are examples of the sources 202-206. The speaker 202B generates a speech audio signal 222B, the speaker 204B generates a speech audio signal 224B, and the speaker 206B generates a speech audio signal 226B. According to one implementation, each speech audio signal 222B-226B corresponds to speech that is part of an ongoing conversation. For example, the speakers 202B-206B may be real people speaking near the device 102B.

The microphones 108 of the device 102B are configured to capture the speech audio signals 222B-226B. The spatial location identifier 120 is configured to identify the spatial locations 212-216 in the scene 200B for each speaker 202B-206B. For example, the spatial location identifier 120 determines a first direction-of-arrival of the speech audio signal 222B. Based on the first direction-of-arrival, the spatial location identifier 120 identifies the spatial location 212 of the speaker 202B. Additionally, the spatial location identifier 120 determines a second direction-of-arrival of the speech audio signal 224B. Based on the second direction-of-arrival, the spatial location identifier 120 identifies the spatial location 214 of the speaker 204B. In a similar manner, the spatial location identifier 120 determines a third direction-of-arrival of the speech audio signal 226B. Based on the third direction-of-arrival, the spatial location identifier 120 identifies the spatial location 216 of the speaker 206B. Thus, the spatial location identifier 120 can determine where each speaker 202B-206B is located and how each speaker 202B-206B is positioned.

The audio content identifier 122 of the device 102B is configured to identify audio content for each speech audio signal 222B-226B. To illustrate, the audio content identifier 122 identifies first audio content of the speech audio signal 222B (e.g., identifies a mood of the speaker 202B, a gender of the speaker 202B, an emotion of the speaker 202B, a conversation topic associated with the speaker 202B, or a combination thereof). The audio content identifier 122 identifies second audio content of the speech audio signal 224B (e.g., identifies a mood of the speaker 204B, a gender of the speaker 204B, an emotion of the speaker 204B, a conversation topic associated with the speaker 204B, or a combination thereof). Additionally, the audio content identifier 122 identifies third audio content of the speech audio signal 226B. Thus, the audio content identifier 122 can determine the context of the conversation between the speakers 202B-206B based on the speech audio signals 222B-226B. Additionally, the audio content identifier 122 can determine the gender of each speaker 202B-206B and the mood of each speaker 202B-206B.

The complementary audio unit 124 is configured to generate complementary audio to accompany the speech audio signals 222B-226B. For example, the complementary audio unit 124 may generate channels for different virtual chat-bots to accompany the speech audio signals 222B-226B. The candidate spatial location determination unit 126 is configured to determine the candidate spatial locations 230-236 in the scene 200B based on the identified spatial locations 212-216. To illustrate, the candidate spatial location determination unit 126 inputs data indicative of the identified spatial locations 212-216 into an adaptation block to determine the candidate spatial locations 230-236. The candidate spatial locations 230-236 correspond to locations within the scene 200B that are not associated with the speakers 202B-206B.

According to one implementation, the complementary audio unit 124 can generate a most probable speech stream for virtual chat-bots (e.g., virtual people) to be added to the scene 200B by the device 102B. Each most probable speech stream includes conversation context based on conversation of the speakers 202B-206B, a proper mood for the virtual chat-bot based on conversation of the speakers 202B-206B, a proper gender for the virtual chat-bot based on conversation of the speakers 202B-206B, etc.

The audio generator 128 is configured to generate audio (e.g., panned complementary audio) to playback as virtual sounds that originate from the one or more candidate spatial locations 230-236. For example, the audio generator 128 generates speech that is panned towards the candidate spatial location 230 or provided to a speaker 130B (e.g., a speaker for a virtual chat-bot). The speaker 130B outputs the speech as virtual sound 240B to accompany the speakers 202B-206B. The audio generator 128 generates speech that is panned towards the candidate spatial location 232 or provided to a speaker 132B (e.g., a speaker for a virtual chat-bot). The speaker 132B outputs the speech as virtual sound 242B to accompany the speakers 202B-206B. Additionally, the audio generator 128 generates speech that is panned towards the candidate spatial location 234 or provided to a speaker 134B (e.g., a speaker for a virtual chat-bot). The speaker 134B outputs the speech as virtual sound 244B to accompany the speakers 202B-206B. In a similar manner, the audio generator 128 generates speech that is panned towards the candidate spatial location 236 or provided to a speaker 136B (e.g., a speaker for a virtual chat-bot). The speaker 136B outputs the speech as virtual sound 246B to accompany the speakers 202B-206B.

According to one implementation, the processor 106 may insert the virtual chat-bots into the virtual locations 230-236 on the display screen 110. Thus, a user can see virtual people, via the display screen 110, along with the speakers 202B-206B to create an enhanced mixed reality experience while the virtual speech is played. The supplemental devices 140-146 activate each time a sound is output by a respective speaker 130B-136B.

The techniques described with respect to FIG. 4 enables complementary speech or conversations to be inserted into the scene 200B using the speakers 130B-136B based on detected speech audio signals 222B-226B from the speakers 202B-206B. As a result, a user experience is enhanced. For example, the device 102B can generate complementary conversation to be inserted into the scene 200B as virtual sounds 240B-246B. Although FIGS. 2-4 illustrate three sources, four candidate spatial locations, and four virtual sounds, in other implementations, the techniques described herein can be implemented using a different number of sources, candidate spatial locations, and virtual sounds.

Figure 5:
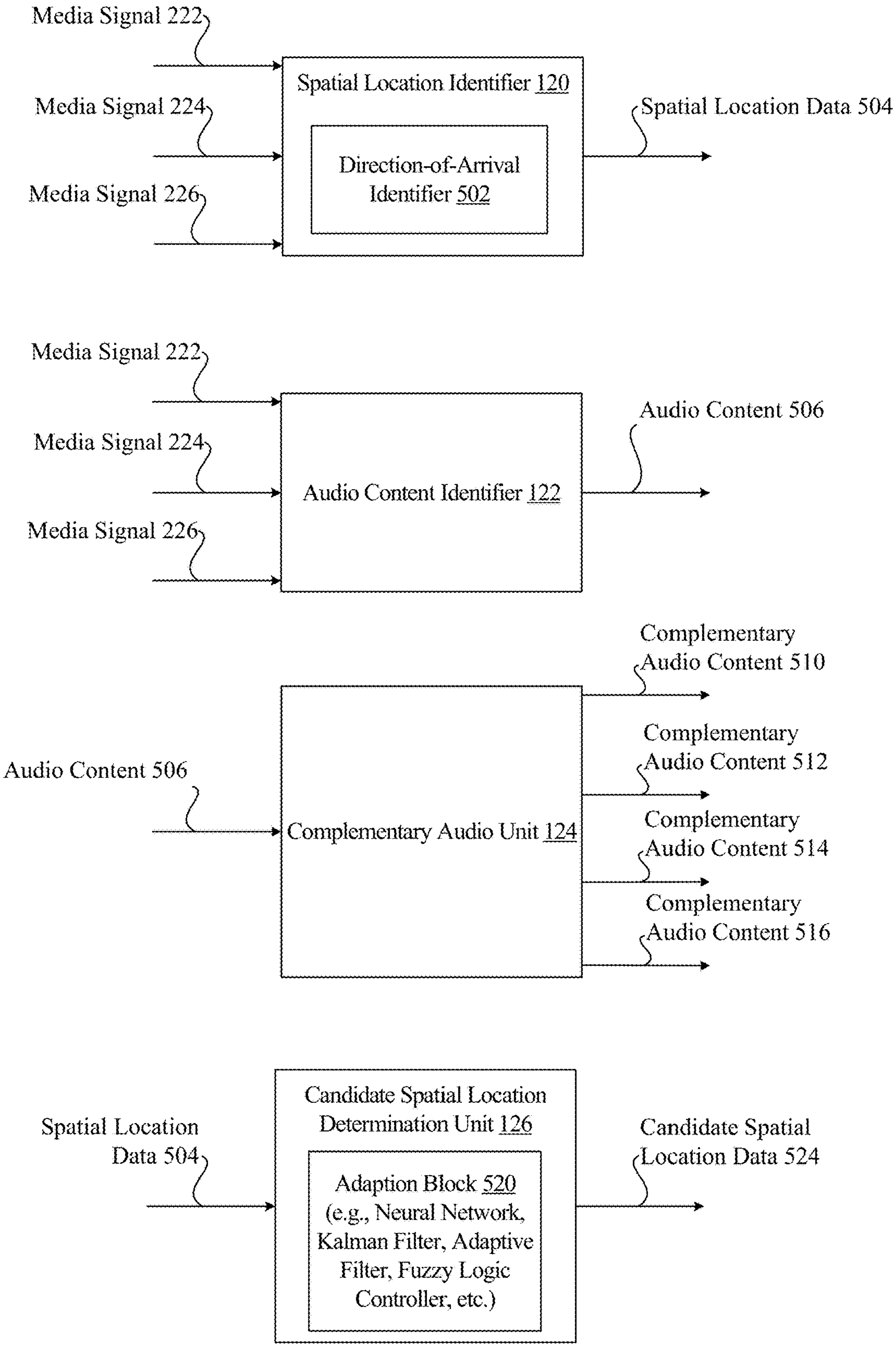
FIG. 5 depicts a particular implementation of different components within the device of FIG. 2.

Referring to FIG. 5, example diagrams of the spatial location identifier 120, the audio content identifier 122, the complementary audio unit 124, and the candidate spatial location determination unit 126 are shown.

The spatial location identifier 120 includes a direction-of-arrival identifier 502. The media signals 222-226 are provided to the spatial location identifier 120. The spatial location identifier 120 is configured to identify the spatial locations 212-216 in the scene 200 for the sources 202-206, respectively, based on the media signals 222-226. To illustrate, the direction-of-arrival identifier 502 is configured to determine the first direction-of-arrival of the media signal 222, the second direction-of-arrival of the media signal 224, and the third direction-of-arrival of the media signal 226. According to one implementation, the spatial location identifier 120 determines reverberation characteristics of the media signals 222-226 to determine how far the sources 202-206 associated with the media signals 222-226 are from the device 102. Based on the reverberation characteristics and the direction-of-arrivals, the spatial location identifier 120 generates spatial location data 504 that identifies the spatial locations 212-216 of the sources 202-206 within the scene 200. Although the media signals 222-226 are shown in FIG. 5, in other implementations, the musical audio signals 222A-226A or the speech audio signals 222B-226B are provided to the spatial location identifier 120. In a similar manner as with respect to the media signals 222-226, the spatial location identifier 120 can determine the spatial location data 504 based on the musical audio signals 222A-226A or based on the speech audio signal 222B-226B.

According to one implementation, the spatial location identifier 120 can have a multiple microphone input configured to receive the media signals 222-226, a multi-camera input configured to receive images (of the scene 200) associated the media signals 222-226, or a multi-sensor input (e.g., accelerometer, barometer, global positioning system (GPS)) configured to receive the media signals 222-226. Based on the input, the spatial location identifier 120 can determine the position of the sources 202-206 (e.g., whether the sources 202-206 are standing, sitting, moving, etc.), the position of available spots for virtual chat-bots or virtual instruments, the height of each source 202-206, etc.

The media signals 222-226 are also provided to the audio content identifier 122. The audio content identifier 122 generates audio content 506 based on the media signals 222-226. To illustrate, the media signals 222-226 includes the musical audio signals 222A-226A, respectively. The audio content identifier 122 identifies the melodies associated with the musical audio signals 222A-226A, the types of instruments associated with the musical audio signals 222A-226A, the genre of music associated with the musical audio signals 222A-226A, or a combination thereof. The melodies, the instrument types, and the genres are stored as a part of the audio content 506. According to another illustration, the media signals 222-226 include the speech audio signals 222B-226B, respectively. The audio content identifier 122 identifies the moods of the speakers 202B-206B associated with the speech audio signals 222B-226B, the genders of the speakers 202B-206B, the emotions of the speakers 202B-206B, the conversation topics of the speakers 202B-206B, or a combination thereof. The moods, the genders, the emotions, and the conversation topics are stored as part of the audio content 506.

The audio content 506 is provided to the complementary audio unit 124. The complementary audio unit 124 is configured to generate (or select) complementary audio content 510-516 based on the audio content 506. To illustrate, in the musical context scenario, the complementary audio unit 124 may generate complementary audio content 510 (e.g., a channel) for the virtual bass to accompany the properties (e.g., the melodies, the instruments, the genres, etc.) associated with the audio content 506. The complementary audio unit 124 may also generate complementary audio content 512 for the virtual drum set, complementary audio content 514 for the virtual tambourine, and complementary audio content 516 for the virtual clarinet. In the speech context scenario, the complementary audio unit 124 may generate complementary audio 510-516 (e.g., channels) for the virtual chat-bots to accompany the properties (e.g., the moods, the genders, the emotions, the conversation topics, etc.) associated with the audio content 506.

The candidate spatial location determination unit 126 is configured to generate candidate spatial location data 524 based on the spatial location data 504. To illustrate, the candidate spatial location determination unit 126 includes an adaptation block 520. The adaptation block 520 includes a neural network, a Kalman filter, an adaptive filter, fuzzy logic, or a combination thereof. The candidate spatial location determination unit 126 inputs the spatial location data 504 into the adaptation block 520 to generate the candidate spatial location data 524. The candidate spatial location data 524 indicates the candidate spatial locations 230-236.

According to one implementation, the neural network of the adaptation block 520 can be trained to indicate a posterior probability where each virtual source should be located. One technique for training the neural network is based on stored rules for different scenarios. For example, if all of the speakers 202B-206B are sitting in a conference room, the neural network may be trained to find the nearest empty chair as a candidate spatial location. If no chair is available, the neural network may be trained to locate a position equidistant from each of the speakers 202B-206B (e.g., a center location) as a candidate spatial location.

Each spatial location 212-216 may be encoded as a vector (e.g., a "hot" vector), and each source 202-206 identification may be encoded as a vector. The spatial locations 212-216 and the sound source 202-206 identifications may be used by the device 102 to determine a room impulse response (RIR) for the spatial rendering of the scene 200.

The components illustrated in FIG. 5 enable the device 102 to generate the complementary audio content 510-516 and identify the candidate spatial locations 230-236. As described in greater detail with respect to FIG. 6, the complementary audio content 510-516 and the candidate spatial locations 230-236 are used by the audio generator 128 to generate audio that is output (by the speakers 130-136 or the headphones 118) as virtual sounds to enhance the user experience.

Figure 6:
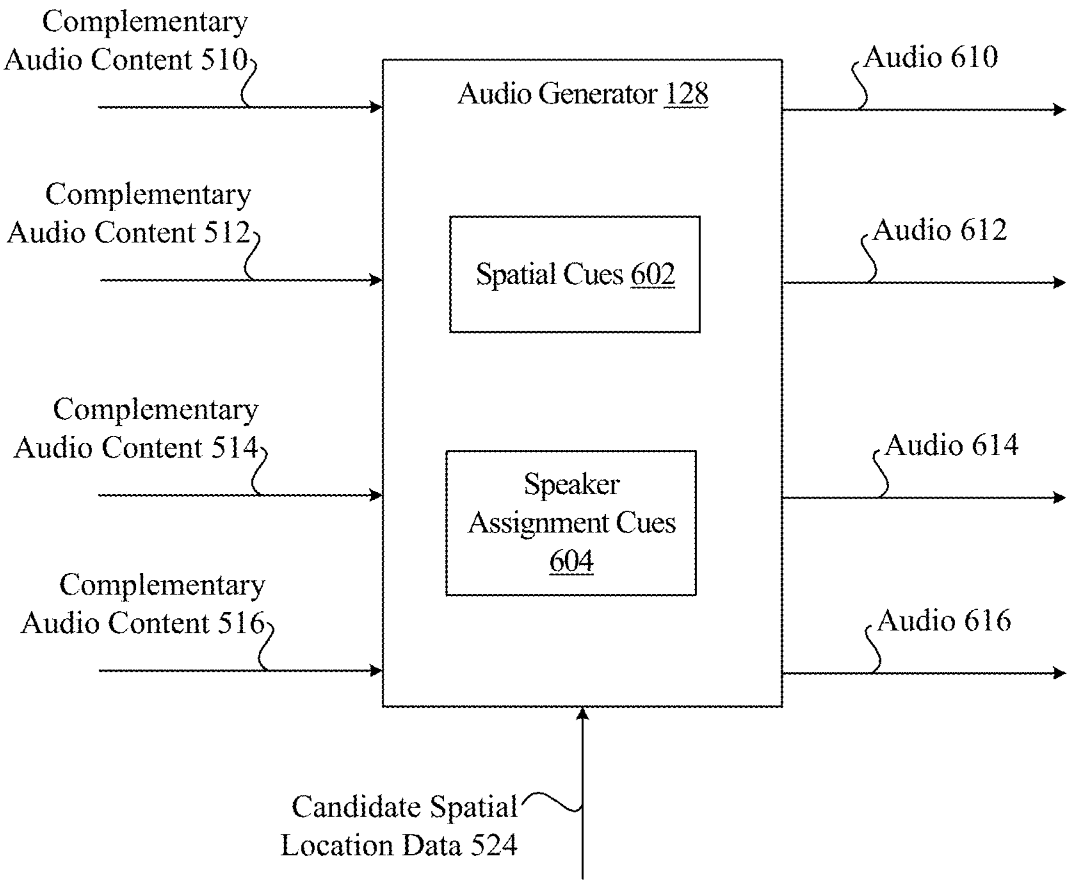
FIG. 6 depicts a particular implementation of a audio generator.

Referring to FIG. 6, an example of the audio generator 128 is shown. The complementary audio content 510-516 and the candidate spatial location data 524 is provided to the audio generator 128. Based on the candidate spatial location 524, the audio generator 128 can apply spatial cues 602 or speaker assignment cues 604 for different complementary audio content 510-516.

To illustrate, the audio generator 128 may apply particular spatial cues 602 to the complementary audio content 510 to generate audio 610 that is spatially panned in the direction of the candidate spatial location 230. In this scenario, the audio 610 is output as the virtual sound 240. According to one implementation, the audio 610 may be output by a speaker that is not located at the candidate spatial location 230. For example, based on the location of the speaker assigned to output the audio 610, the audio generator 128 may apply spatial cues 602 to spatially pan the audio 610 in the direction of the candidate spatial location 230. Alternatively, the audio generator 128 may apply particular speaker assignment cues 604 to the complementary audio content 510 such that the audio 610 is output from the speaker 130 as the virtual sound 240.

The audio generator 128 may apply particular spatial cues 602 to the complementary audio content 512 to generate audio 612 that is spatially panned in the direction of the candidate spatial location 232. In this scenario, the audio 612 is output as the virtual sound 242. According to one implementation, the audio 612 may be output by a speaker that is not located at the candidate spatial location 232. For example, based on the location of the speaker assigned to output the audio 612, the audio generator 128 may apply spatial cues 602 to spatially pan the audio 612 in the direction of the candidate spatial location 232. Alternatively, the audio generator 128 may apply particular speaker assignment cues 604 to the complementary audio content 512 such that the audio 612 is output from the speaker 132 as the virtual sound 242.

The audio generator 128 may apply particular spatial cues 602 to the complementary audio content 514 to generate audio 614 that is spatially panned in the direction of the candidate spatial location 234. In this scenario, the audio 614 is output as the virtual sound 244. According to one implementation, the audio 614 may be output by a speaker that is not located at the candidate spatial location 234. For example, based on the location of the speaker assigned to output the audio 614, the audio generator 128 may apply spatial cues 602 to spatially pan the audio 614 in the direction of the candidate spatial location 234. Alternatively, the audio generator 128 may apply particular speaker assignment cues 604 to the complementary audio content 514 such that the audio 614 is output from the speaker 134 as the virtual sound 244.

The audio generator 128 may apply particular spatial cues 602 to the complementary audio content 516 to generate audio 616 that is spatially panned in the direction of the candidate spatial location 236. In this scenario, the audio 616 is output as the virtual sound 246. According to one implementation, the audio 616 may be output by a speaker that is not located at the candidate spatial location 236. For example, based on the location of the speaker assigned to output the audio 616, the audio generator 128 may apply spatial cues 602 to spatially pan the audio 616 in the direction of the candidate spatial location 236. Alternatively, the audio generator 128 may apply particular speaker assignment cues 604 to the complementary audio content 516 such that the audio 616 is output from the speaker 136 as the virtual sound 246.

Thus, the audio generator 128 of FIG. 6 enables the complementary audio content 510-516 to be spatially panned to the candidate spatial locations 230-236 within the scene 200. As a result, a user experience (of a user of the device 102) is enhanced because the complementary audio is output from different locations.

Figure 7:
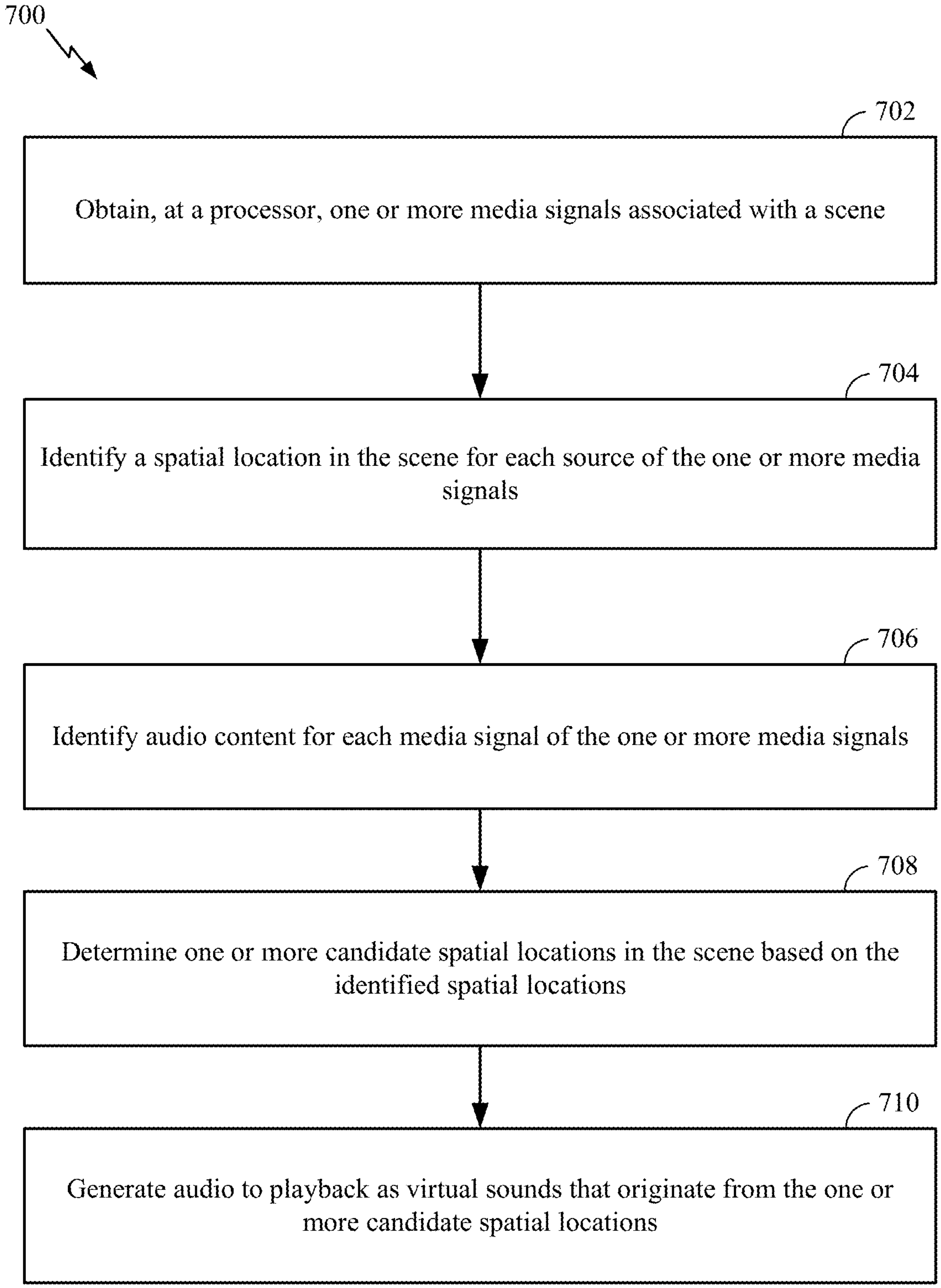
FIG. 7 is a flowchart of a method for generating audio to playback as complementary virtual sounds.

Referring to FIG. 7, a method 700 for generating audio to playback as complementary virtual sounds is shown. The method 700 may be performed by the system 100, the device 102, the device 102A, the device 102B, the spatial location identifier 120, the audio content identifier 122, the complementary audio unit 124, the candidate spatial location determination unit 126, the audio generator 128, or a combination thereof.

The method 700 includes obtaining, at a processor, one or more media signals associated with a scene, at 702. As a non-limiting example, the microphones 108 capture the media signals 222-226 from the sources 202-206, respectively, and the processor 106 receives the captured media signals 222-226. The media signals 222-226 can include the musical audio signals 222A-226A, the speech audio signals 222B-226B, or a combination thereof. The media signals 222-226 may also be obtained by reading data (associated with the media signals 222-226) from the memory 104.

The method 700 also includes identifying a spatial location in the scene for each source of the one or more media signals, at 704. For example, the spatial location identifier 120 identifies the spatial location 212 of the source 202 based on the first direction-of-arrival of the media signal 222, identifies the spatial location 214 of the source 204 based on the second direction-of-arrival of the media signal 224, and identifies the spatial location 216 of the source 206 based on the third direction-of-arrival of the media signal 226. Reverberation characteristics of the media signals 222-

226 may also be used by the spatial location identifier 120 to determine a distance between the sources 202-206 and the device 102.

The method 700 also includes identifying audio content for each media signal of the one or more media signals, at 706. For example, the audio content identifier 122 generates the audio content 506 that indicates the audio content of the media signals 222-226. The method 700 also includes determining one or more candidate spatial locations in the scene based on the identified spatial locations, at 708. For example, the candidate spatial location determination unit 126 inputs to the spatial location data 504 into the adaptation block 520 to generate the candidate spatial location data 524. The candidate spatial location data 524 indicates the candidate spatial locations 230-236 in the scene 200.

According to one implementation, the method 700 includes generating complementary audio content based on the audio content. For example, the complementary audio unit 124 generates the complementary audio content 510-516 to accompany the audio associated with the media signals 222-226. According to another implementation, the method 700 includes selecting the complementary audio content based on the audio content. For example, the complementary audio unit 124 selects the complementary audio content 510-516 from the memory 104.

The method 700 also includes generating audio to playback as virtual sounds that originate from the one or more candidate spatial locations, at 710. The audio includes complementary audio content to the audio content. For example, the audio generator 128 generates the audio 610-616 that is output from the speakers 130-136 as virtual sounds 240-246, respectively.

The method 700 of FIG. 7 enables complementary audio to be inserted into the scene 200 based on detected audio (e.g., the detected media signals 222-226) within the scene 200. As a result, a user experience is enhanced. For example, the complementary music is generated and inserted into the scene 200 as virtual audio (e.g., the virtual sounds 240A-246A) if a relatively small number of musical sources 202A-206A are present in the scene 200. To illustrate, a nearby singer that sings acapella is detected, and a musical accompaniment is generated for the singer and inserted into the scene 200 using the speakers 130-136. The musical accompaniment is panned based on spatial cues (e.g., based on a location of the candidate spatial locations 230-236). Thus, the method 700 enables generation of complementary virtual audio to enhance (e.g., add to) the acoustical arrangement of a nearby scene 200.

Referring to FIG. 8, a device 102C is shown. The device 102C corresponds to a particular implementation of the device 102. The device 102C is a mixed reality headset that is operable to generate audio to playback as complementary virtual sounds.

The device 102C includes a microphone 108A, a microphone 108B, a microphone 108C, and a microphone 108D. According to one implementation, the microphones 108A-108D correspond to the one or more microphones 108. The microphones 108A-108D are configured to capture the media signals 222-226, the musical audio signals 222A-226A, the speech audio signals 222B-226B, etc.

The device 102C also includes a display screen 110A. According to one implementation, the display screen 110A corresponds to the display screen 110. The display screen 110A is configured to display an arrangement in space of each source 202-206 of the media signals 222-226. For example, the display screen 110A displays the location of each source 202-206. According to one implementation, the device 102C generations inserts virtual objects into the arrangement displayed by the display screen 110A. As a non-limiting example, the display screen 110A can also display a virtual bass guitar at the candidate spatial location 230, a virtual drum set at the candidate spatial location 232, a virtual tambourine at the candidate spatial location 234, and a virtual clarinet at the candidate spatial location 236. As another non-limiting example, the display screen 110A can display visual representations of virtual chat-bots at the candidate spatial locations 230-236.

Thus, the device 102C enables a user to view real objects (e.g., the sources 202-206) and virtual objects for which audio is generated for playback as complementary virtual sounds. As a result, a user experience is enhanced. For example, in addition to hearing the complementary audio (via the headphones 118 (not shown) that are integrated into the device 102C), the user can see virtual objects corresponding to the audio when wearing the device 102C.

Referring to FIG. 9, a block diagram of the device 102 is shown. According to one implementation, the device 102 is a wireless communication device.

In a particular implementation, the device 102 includes a processor 906, such as a central processing unit (CPU) or a digital signal processor (DSP), coupled to the memory 104. The memory 104 includes instructions 960 (e.g., executable instructions) such as computer-readable instructions or processor-readable instructions. The instructions 960 may include one or more instructions that are executable by a computer, such as the processor 906 or the processor 106. The memory 104 also includes a complementary audio database 999. The complementary audio database 999 stores complementary audio content, such as the complementary audio content 510-516.

FIG. 9 also illustrates a display controller 926 that is coupled to the processor 106 and to the display screen 110. A coder/decoder (CODEC) 934 may also be coupled to the processor 906 and to the processor 106. The headphones 118 and the microphones 108 may be coupled to the CODEC 934. The processor 106 includes the spatial location identifier 120, the audio content identifier 122, the complementary audio unit 124, the candidate spatial location determination unit 126, and the audio generator 128.

The audio player 112 and the video player 113 are coupled to the processor 106 and to the decoder 114. The receiver 116 is coupled to the decoder 114, and an antenna 942 is coupled to the receiver 116. The antenna 942 is configured to receive a media bitstream that includes representations of the media signals 222-226 and images associated with the scene 200. In some implementations, the processor 106, the display controller 926, the memory 104, the CODEC 934, the audio player 112, the video player 113, the decoder 114, the receiver 116, and the processor 906 are included in a system-in-package or system-on-chip device 922. In some implementations, the cameras 119 and a power supply 944 are coupled to the system-on-chip device 922. Moreover, in a particular implementation, as illustrated in FIG. 9, the display screen 110, the cameras 119, the headphones 118, the microphones 108, the antenna 942, and the power supply 944 are external to the system-on-chip device 922.

The device 102 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 104 may include or correspond to a non-transitory computer readable medium storing the instructions 960. The instructions 960 may include one or more instructions that are executable by a computer, such as the processors 106, 906 or the CODEC 934. The instructions 960 may cause the processor 106 to perform one or more operations described herein, including but not limited to one or more portions of the method 700 of FIG. 7.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

Figure 10:
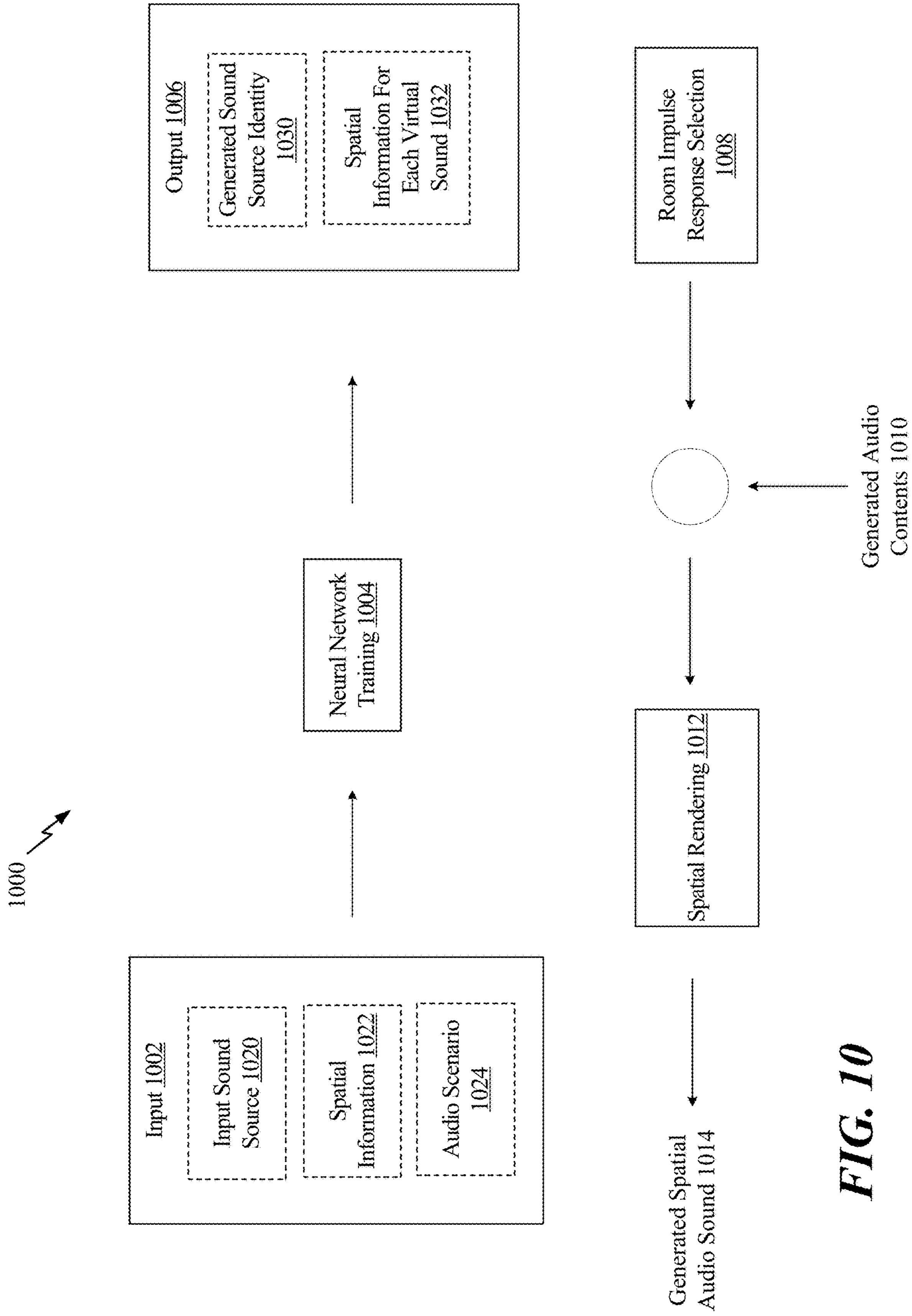
FIG. 10 is a flow chart illustrating an example of finding a most probable location to insert a virtual sound.

Referring to FIG. 10, a flow chart 1000 illustrating an example of finding a most probable location to insert a virtual sound is shown. The operations of the flow chart 1000 can be implemented by the neural network of the adaptation block 520.

According to the flow chart 1000, an input 1002 is provided to a neural network training block 1004. The input 1002 includes an input sound source 1020, spatial information 1022, and audio scenario information 1024. The input sound source 1020 indicates the source 202-206 identifications (e.g., speaker identifications or instrument identifications). The spatial information 1022 indicates the spherical coordinates of the sources 202-206, and the audio scenario information 1024 indicates the audio environment (e.g., library, conference room, band set, etc.). Based on the input 1002, the neural network training block 1004 generates an output 1006. The output 1006 includes generated sound source identity information 1030 and spatial information 1032 for each virtual sound. The generated sound source identity information 1030 indicates the type of instrument for the virtual sound, properties of the chat-bot for the virtual sound, etc. According to one implementation, the generated sound source identity information 1030 includes a virtual instrument identification or a virtual speaker identification. The spatial information 1032 indicates the candidate spatial locations 230-236.

Based on the spatial information 1032, a room impulse response (RIR) selection 1008 is performed. For example, room impulse response may be selected from a data set. Generated audio contents 1010 (e.g., at least one of the complementary audio content 510-516) is combined with the room impulse response and provided to a spatial rendering block 1012. The spatial rendering block 1012 spatially pans the generated audio contents based on the room impulse response to generate spatial audio sound 1014.

In conjunction with the described techniques, an apparatus includes means for receiving one or more media signals associated with a scene. For example, the means for receiving includes the receiver 116, the decoder 114, the audio player 112, the video player 113, the microphones 108, the cameras 119, one or more other devices, circuits, modules, or any combination thereof.

The apparatus also includes means for identifying a spatial location in the scene for each source of the one or more media signals. For example, the means for identifying the spatial location includes the spatial location identifier 120, the direction-of-arrival identifier 502, one or more other devices, circuits, modules, or any combination thereof.

The apparatus also includes means for identifying audio content for each media signal of the one or more media signals. For example, the means for identifying the audio content includes the audio content identifier 122, one or more other devices, circuits, modules, or any combination thereof.

The apparatus also includes means for determining one or more candidate spatial locations in the scene based on the identified spatial locations. For example, the means for determining includes the candidate spatial location determination unit 126, the adaptation block 520, a neural network, a Kalman filter, and adaptive filter, a fuzzy logic controller, one or more other devices, circuits, modules, or any combination thereof.

The apparatus also includes means for generating audio to playback as virtual sounds that originate from the one or more candidate spatial locations. The audio includes complementary audio content to the audio content. For example, the means for generating includes the audio generator 128, one or more other devices, circuits, modules, or any combination thereof.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the HOA coefficients for playback by one or more of the playback elements. For instance, a user of the mobile device may record (acquire a sound field of) a live event (e.g., a meeting, a conference, a play, a concert, etc.), and code the recording into HOA coefficients.

The mobile device may also utilize one or more of the playback elements to playback the HOA coded sound field. For instance, the mobile device may decode the HOA coded sound field and output a signal to one or more of the playback elements that causes the one or more of the playback elements to recreate the sound field. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into HOA, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a sound field for playback by the delivery systems.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:

a processor configured to:

obtain one or more media signals associated with a scene;

identify a spatial location in the scene for each source of the one or more media signals;

identify audio content characteristics for each media signal of the one or more media signals;

determine, based on the identified spatial locations, one or more candidate spatial locations in the scene that are not associated with an audio source;

select, based on the audio content characteristics and from a source different than the one or more media signals, complementary audio content to audio content of the one or more media signals; and generate the complementary audio content to playback as virtual sounds that originate from the one or more candidate spatial locations.

2. The apparatus of claim 1, wherein the processor is further configured to identify the spatial location in the scene for each of the one or more media signals based on video data of the scene.

3. The apparatus of claim 1, wherein the processor is further configured to generate the complementary audio content based on the audio content.

4. The apparatus of claim 1, wherein a particular media signal of the one or more media signals comprises first sound associated with a first type of instrument, and wherein the complementary audio content comprises second sound associated with a second type of instrument distinct from the first type of instrument.

5. The apparatus of claim 1, further comprising one or more microphones coupled to the processor, the one or more microphones configured to capture one or more audio signals included in the one or more media signals.

6. The apparatus of claim 5, wherein each media signal of the one or more media signals consists of an audio signal.

7. The apparatus of claim 1, further comprising one or more cameras coupled to the processor, the one or more cameras configured to capture one or more images associated with the one or more media signals.

8. The apparatus of claim 1, further comprising:

a decoder configured to decode a media bitstream to generate a decoded media bitstream, wherein a representation of the one or more media signals is included in the media bitstream.

9. The apparatus of claim 8, further comprising an audio player coupled to the decoder and to the processor, the audio player configured to play the decoded media bitstream to generate one or more reconstructed audio signals.

10. The apparatus of claim 9, further comprising a video player coupled to the decoder and to the processor, the video player configured to play the decoded media bitstream to generate one or more reconstructed images.

11. The apparatus of claim 1, further comprising a display screen coupled to the processor, the display screen configured to display an arrangement in space of each source of the one or more media signals.

12. The apparatus of claim 1, further comprising one or more speakers coupled to the processor, the one or more speakers configured to playback the complementary audio content.

13. The apparatus of claim 12, further comprising a supplementary device configured to activate in response to a particular speaker of the one or more speakers outputting sound, the supplementary device proximate to the particular speaker or integrated within the particular speaker.

14. The apparatus of claim 13, wherein the supplementary device comprises a light, and wherein activation of the supplementary device comprises illumination of the light.

15. The apparatus of claim 13, wherein the supplementary device comprises a virtual assistant, and wherein activation of the supplementary device comprises generation of complementary sound.

16. The apparatus of claim 1, wherein the audio content for a particular audio signal included in the one or more media signals indicates a melody associated with the particular audio signal, a type of instrument associated with the particular audio signal, a genre of music associated with the particular audio signal, or a combination thereof.

17. The apparatus of claim 16, wherein the complementary audio content includes musical content that accompanies the audio content.

18. The apparatus of claim 1, wherein the audio content for a particular audio signal included in the one or more media signals indicates a mood of a speaker associated with the particular audio signal, a gender of the speaker, an emotion of the speaker, a conversation topic associated with the speaker, or a combination thereof.

19. The apparatus of claim 18, wherein the complementary audio content includes speech content that accompanies the audio content.

20. The apparatus of claim 1, wherein the processor is further configured to determine a direction-of-arrival for each media signal of the one or more media signals, the spatial location for each source based on the direction-of-arrival of a corresponding media signal.

21. The apparatus of claim 1, wherein the processor is further configured to input the identified spatial locations into an adaptation block to determine the one or more candidate spatial locations.

22. The apparatus of claim 21, wherein the adaptation block comprises a neural network, a Kalman filter, an adaptive filter, a fuzzy logic controller, or a combination thereof.

23. A method comprising:

obtaining, at a processor, one or more media signals associated with a scene;

identifying a spatial location in the scene for each source of the one or more media signals;

identifying audio content characteristics for each media signal of the one or more media signals;

determining, based on the identified spatial locations, one or more candidate spatial locations in the scene that are not associated with an audio source;

selecting, based on the audio content characteristics and from a source different than the one or more media signals, complementary audio content to audio content of the one or more media signals; and generating the complementary audio content to playback as virtual sounds that originate from the one or more candidate spatial locations.

24. The method of claim 23, further comprising taking images of the scene, wherein the identified spatial locations are identified based on analysis of the images.

25. The method of claim 23, wherein the audio content for a particular audio signal included in the one or more media signals indicates a melody associated with the particular audio signal, a type of instrument associated with the particular audio signal, a genre of music associated with the particular audio signal, or a combination thereof, and wherein the complementary audio content includes musical content that accompanies the audio content.

26. The method of claim 23, wherein the audio content for a particular audio signal included in the one or more media signals indicates a mood of a speaker associated with the particular audio signal, a gender of the speaker, an emotion of the speaker, a conversation topic associated with the speaker, or a combination thereof, and wherein the complementary audio content includes speech content that accompanies the audio content.

27. A non-transitory computer-readable medium comprising instructions that, when executed by a processor, cause the processor to:

obtain one or more media signals associated with a scene;

identify a spatial location in the scene for each source of the one or more media signals;

identify audio content characteristics for each media signal of the one or more media signals;

determine, based on the identified spatial locations, one or more candidate spatial locations in the scene that are not associated with an audio source;

select, based on the audio content characteristics and from a source different than the one or more media signals, complementary audio content to audio content of the one or more media signals; and generate the complementary audio content to playback as virtual sounds that originate from the one or more candidate spatial locations.

28. The non-transitory computer-readable medium of claim 27, wherein the spatial location in the scene for each source of the one or more media signals are determined based on directions-of-arrival for each of the media signals.

29. The non-transitory computer-readable medium of claim 27, wherein the audio content for a particular audio signal included in the one or more media signals indicates a melody associated with the particular audio signal, a type of instrument associated with the particular audio signal, a genre of music associated with the particular audio signal, or a combination thereof.

30. An apparatus comprising:

means for obtaining one or more media signals associated with a scene;

means for identifying a spatial location in the scene for each source of the one or more media signals;

means for identifying audio content characteristics for each media signal of the one or more media signals;

means for determining, based on the identified spatial locations, one or more candidate spatial locations in the scene that are not associated with an audio source;

means for selecting, based on the audio content characteristics and from a source different than the one or more media signals, complementary audio content to audio content of the one or more media signals; and means for generating the complementary audio content to playback as virtual sounds that originate from the one or more candidate spatial locations.

* * * * *